US006813509B2

United States Patent
Aquilar et al.

(10) Patent No.: US 6,813,509 B2
(45) Date of Patent: Nov. 2, 2004

(54) SWITCH

(75) Inventors: Andrew Aquilar, Hemel Hempstead (GB); Phil Barrowclough, Basingstoke (GB)

(73) Assignee: Nokia Mobile Phone Limited, Espoo (FI)

( * ) Notice: Subject to any disclaimer, the term of this patent is extended or adjusted under 35 U.S.C. 154(b) by 565 days.

(21) Appl. No.: 09/739,103

(22) Filed: Dec. 19, 2000

(65) Prior Publication Data

US 2001/0004584 A1 Jun. 21, 2001

(30) Foreign Application Priority Data

Dec. 21, 1999 (GB) ................................ 9930242

(51) Int. Cl.[7] .............................................. H04B 1/38
(52) U.S. Cl. ........................ 455/550.1; 455/575.1; 455/90.3; 455/344; 455/66.1; 455/74; 455/418; 200/504; 200/4; 200/11 R; 200/11 A; 200/11 TW; 200/14; 379/433.06; 379/433.07; 379/368
(58) Field of Search ......................... 455/550.1, 575.1, 455/90.3, 344, 66.1, 74, 418; 379/433.06, 433.07, 368; 200/564, 4, 11 R, 11 A, 11 TW, 14

(56) References Cited

U.S. PATENT DOCUMENTS

| 4,851,752 | A | * | 7/1989 | Nishimura et al. | ......... 318/602 |
| 4,920,341 | A | * | 4/1990 | Aoki et al. | .................... 341/15 |
| 5,436,954 | A | * | 7/1995 | Nishiyama et al. | ......... 455/566 |
| 6,097,964 | A | * | 8/2000 | Nuovo et al. | ................ 455/566 |
| 6,194,673 | B1 | * | 2/2001 | Sato et al. | ...................... 200/4 |
| 6,218,635 | B1 | * | 4/2001 | Shigemoto et al. | ......... 200/570 |
| 6,333,473 | B1 | * | 12/2001 | Sawada et al. | ................ 200/4 |

FOREIGN PATENT DOCUMENTS

| DE | 1110276 | 7/1961 |
| EP | 0901262 | 3/1999 |
| GB | 2260598 | 4/1993 |
| GB | 2329070 | 3/1999 |
| JP | 11039998 | 2/1999 |

* cited by examiner

Primary Examiner—Lee Nguyen
Assistant Examiner—Minh D. Dao
(74) Attorney, Agent, or Firm—Antonelli, Terry, Stout & Kraus, LLP

(57) ABSTRACT

A rotary switch is disclosed. The switch has a rotatable barrel which has an axis of rotation. The switch also has an encoder pattern for sensing rotation of the barrel. The encoder pattern extends in a longitudinal direction with respect to the axis of rotation of the barrel.

15 Claims, 4 Drawing Sheets

SWITCH

BACKGROUND OF THE INVENTION

1. Field of the Invention

This inventions relates to a roller switch. It particularly relates to a roller switch suitable for use in handheld electronic equipment such as portable radio telephones.

2. Description of the Prior Art

Portable radio telephones require a number of keys to enable the user to operate the phone. As well as the regular alphanumeric keys (0–9, *, #), additional function keys are necessary in order to access menus, adjust volume, or scroll up or down for instance. Scrolling up or down through a long list of possible options can be time consuming and awkward when individual key presses have to be used.

Possible alternative means of scrolling that have been suggested or implemented are the trackball, as used in a computer 'mouse', or the roller switch 10, as used in the Nokia® 7110 mobile phone 1, as shown in FIG. 1. Trackballs tend to be difficult to implement in hand-held equipment, and are prone to malfunction due to ingress of dust and dirt, and so are not the preferred option at present. While offering only one-dimensional control and not two-dimensional control like the trackball, roller switches are found to offer satisfactory performance in portable telecommunication equipment. Indeed, they are found to offer several advantages over using individual up/down or left/right keys. For instance, entering text into a mobile phone using only the numeric keypad can be time-consuming and prone to error due to the grouping of several letters on each key (2=abc, 3=def, 4=ghi etc.) and the multiple key presses that are required to access any given letter. For instance, to enter the work 'switch', the following key presses are required: 7-7-7-7-9-4-4-4-8-2-2-2-4-4 i.e. fourteen individual key presses are needed to enter this six-letter word.

The use of a roller switch 10 can enable easier entry of characters. When the phone is in a text entering mode, an alphabetical list 11 is presented on the phone display, and the user can scroll up or down the list by rolling the roller switch 10 in an upward or downward direction respectively. This enables the user to scroll through all letters of the alphabet with one continuous action. To increase functionality further, the roller switch is additionally adapted to be depressed, with the depression triggering a further switch that can be used to indicate selection of a highlighted option on the display. In the example shown in FIG. 1, the letter "j" is highlighted, and depressing the roller switch 10 will select that letter and enter it into the text at the entry point defined by a cursor.

Such a roller switch is disclosed in co-assigned patent application EP0901262A. FIG. 2a shows a view of the roller switch assembly of this patent application, and FIG. 2b shows a view of the roller barrel and associated encoder parts in isolation.

FIG. 2a shows the roller barrel mounted for rotation in its support structure. It shows the hinge 28 which connects the assembly to the telephone. It is the structure of this point that allows the switch to be depressed, effectively rotating about the hinge 28, thus actuating a further micro switch positioned underneath the roller barrel assembly. Also shown is a terminal part 62 which carries the electrical contacts from the switch.

FIG. 2b shows an end view of barrel 60, and the encoder pattern 70 disposed thereon. The encoder pattern comprises conducting and non-conducting portions. The conducting portions are shown as the white areas. The non-conducting portions are the shaded areas. Also shown are the positions of the three sensors X, Y and Z which co-operate with the encoder to sense the rotation of the barrel 60.

The sensors them selves are arranged to be parallel with the end face of the barrel. The signals received by a microprocessor from each of the sensors will depend on whether it is currently contacting a conducting or non-conducting portion of the encoder pattern. From changes in these signals it is possible to determine whether the roller barrel is being rotated, and also in which direction rotation is occurring. A full description of this process can be found in EP0901262A.

However, a problem with such a switch arrangement occurs when the overall thickness of the telephone is reduced. Telephones are now feasible which have an overall thickness approximating, or even smaller than, the diameter of the roller switch shown in FIGS. 1 and 2. In order to provide suitable encoding structures, a certain barrel diameter is required. This can result in a roller switch which is disproportionately large compared to the rest of the telephone and, consequently, difficult to accommodate within the housing.

SUMMARY OF THE INVENTION

According to the present invention, there is provided a rotary switch comprising: a rotatable barrel, having an axis of rotation; and an encoder pattern for sensing rotation of the barrel wherein the encoder pattern extends in a longitudinal direction with respect to the axis of rotation of the barrel.

By positioning the encoder pattern such that it is longitudinal with respect to the axis of rotation of the roller barrel, it is possible to devote a greater surface area to the encoder pattern, thus allowing for greater reliability and accuracy in sensing the true position of the roller barrel, without needing to provide a large surface area at the end of the barrel. This allows the barrel diameter to be reduced.

The encoder pattern consists of one or more discrete bands. The band, or bands, do not need to be arranged to be coaxial with the axis of rotation of the barrel, but the arrangement is simplified if this is the case.

Adopting a roller switch structure as defined above allows the switch to have a smaller barrel diameter, which can be more easily incorporated into ever smaller portable telephones and other handheld equipment.

The sensors, which contact the encoder pattern, are biased inwards, towards the encoder pattern to ensure reliable electrical contact.

Advantageously, the encoder pattern is arranged to be cylindrical in shape.

The encoder pattern can be implemented in a number of ways. Advantageous embodiments employ sensors relying on electrical contact with either conducting or non-conducting regions of the encoder pattern; or sensors responsive to magnetic and non-magnetic regions of the encoder pattern; or sensors responsive to light and dark regions of the encoder pattern.

The rotary switch of the invention enjoys particularly advantageous use in handheld electronic apparatus, where size can be an important design factor.

A particular use for the rotary switch may be found in portable radio telephones, including such wireless devices which offer data facilities, such as wireless access to the World Wide Web (WWW).

For a better understanding of the present invention, and to understand how the same may be brought into effect, the invention will now be described, by way of example only, with reference to the appended drawings in which:

BRIEF DESCRIPTION OF THE DRAWINGS

FIG. 2b shows a detailed end view of the barrel and encoder section of the roller switch of FIG. 2a;

FIG. 4a shows a detailed view of a roller switch barrel and encoder section according to a second embodiment of the invention;

FIG. 4b shows a schematic representation of the encoder section of the switch of FIG. 4a;

FIG. 5b shows a schematic representation of the encoder pattern used in the roller switch of FIG. 5a; and FIG. 5c shows an end view of an embodiment, in the direction of arrow X, of the roller switch barrel of FIG. 5a.

DETAILED DESCRIPTION OF THE INVENTION

Figure 1:
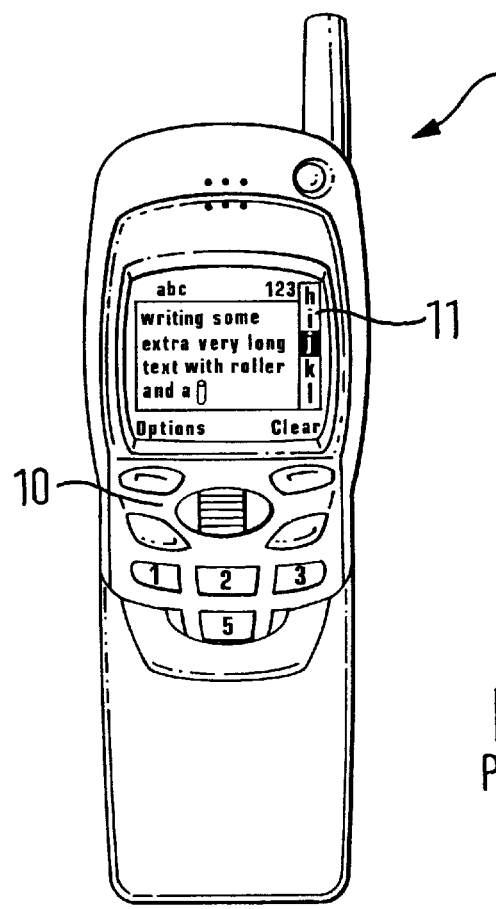
FIG. 1 shows a portable radio telephone comprising a roller switch according to the prior art.
Figure 2A:
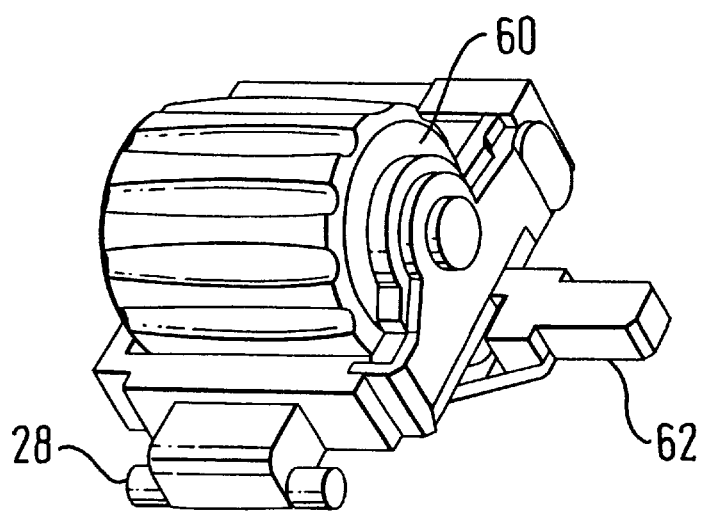
FIG. 2a shows a detailed perspective view of the roller switch assembly as used in the telephone of FIG. 1.
Figure 2B:
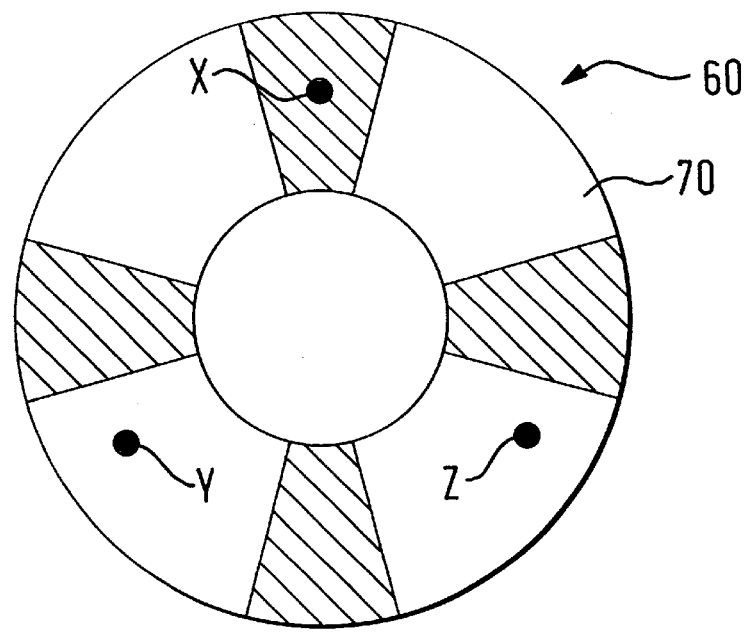
Figure 3:
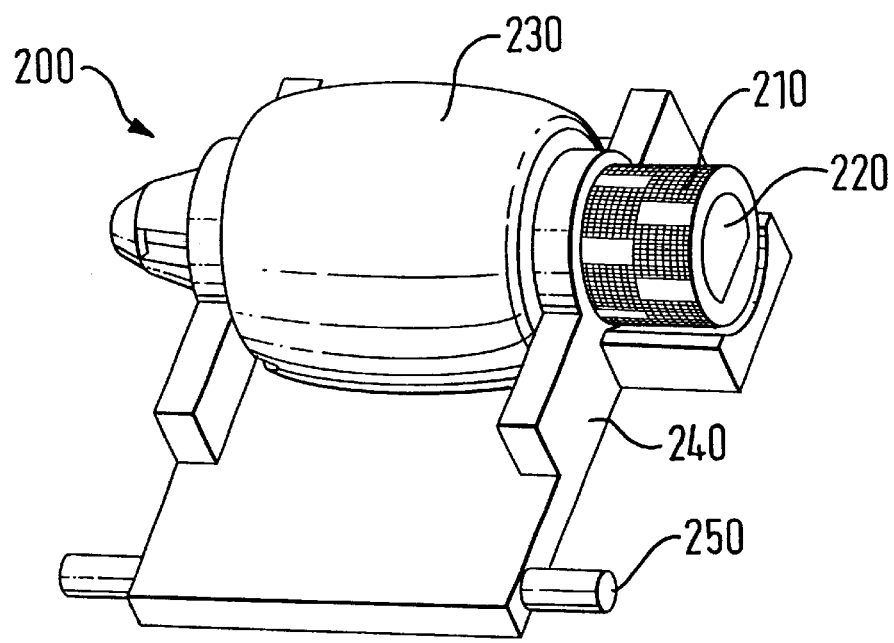
FIG. 3 shows detailed perspective view of a roller switch assembly according to a first embodiment of the invention.

Referring to FIG. 3, there is shown a roller switch 200 according to a first embodiment of the present invention. The roller switch has a roller barrel 230, an encoder pattern 210 disposed on a cylinder 220, a carriage 240 and a hinge member 250.

The roller barrel 230 is mounted for rotation, by a user, on carriage 240. To assist the user, the surface of the barrel may be textured, or coated in a rubber like substance. The roller barrel 230 is mounted such that it rotates in a series of discrete steps, each one corresponding to a movement from one option to another. For instance, in the example presented earlier in relation to the prior art switch, each 'click' of the roller could correspond to a respective selection of the next letter available in the list so that a first step chooses 'a'; a second step chooses 'b'; and a third step chooses 'c', and so on. This tactile, and possibly audible feedback to the user may enable operation without needing to monitor the display continuously. The steps may be delimited through use of a suitably shaped cam member contacting a sprung element which provides a defined number of stable positions for each rotation of the barrel. Any number of steps may be provided, but a suitable number is 12 per revolution.

Attached to the end of the roller barrel 230 is a cylinder 220 on which is disposed an encoder pattern 210. When the switch is assembled into a telephone, only the roller barrel 230 is visible through the telephone housing; cylinder 220 is concealed from view inside the housing.

The encoder pattern 210 consists of two discrete circumferential bands positioned adjacent each other at the outer end of the cylinder 220. These co-operate with two sensors, not shown, to provide signals indicative of the rotation of the barrel. The operation of the encoder pattern is described in detail below.

The entire switch 200 is pivotably attached to the telephone by hinge member 250. This allows switch 200 to be depressed to actuate a further switch, positioned beneath carriage 240, in the manner described previously in relation to the prior art. The roller frame 240 is biased away from the further switch by means of a spring arrangement. The force required to overcome the spring biasing and actuate the switch is arranged to be approximately 3 times for force required to move the roller from one step to the next. Example figures are 1N to move the roller one stop, and 3N to actuate the switch.

Figures 4A, 4B:
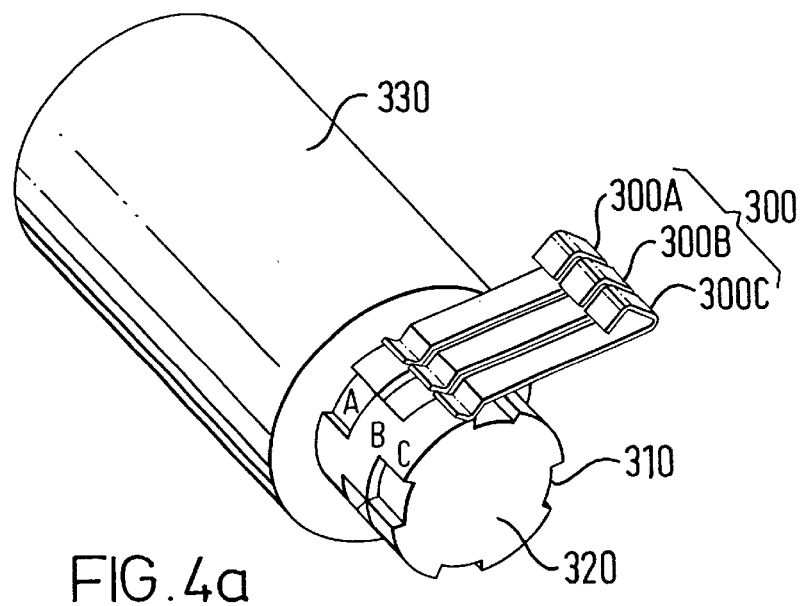

FIG. 4a shows a second embodiment of the invention. Here is shown roller barrel 330, from the end of which protrudes cylinder 320, which carries the encoder pattern 310. FIG. 4a also shows the sensors 300 which are associated with the encoder pattern. Although now shown, the apparatus of FIG. 4a is mounted in a carriage, and connected to the telephone as described in relation to the first embodiment of FIG. 3.

Roller barrel 330 is in all key respects identical to roller barrel 230 of the first embodiment.

Cylindrical 320 protrudes from roller barrel 330 such that the barrel and the cylinder are arranged to share a common longitudinal axis. The encoder pattern 310 consists of three discrete circumferential bands disposed adjacent each other at the outer end of cylinder 320. These three bands, A, B and C, are constructed in a fixed configuration. It can be seen that in this instance, each portion comprises relatively raised and recessed portions. The raised and recessed portions correspond to conducting a non-conducting portions respectively. All conducting portions are electrically connected together.

FIG. 4b shows a schematic view of the three encoder portions, A, B and C. The conducting areas are shown as white, and the non-conducting areas as black. It can be seen that in this embodiment there are 12 distinct states forming one complete rotation of the barrel. With 3 sensors being used in the configuration shown here, the number of discrete steps is a multiple of three.

As the roller barrel is rotated, the encoder pattern 310 moves relative to three fixed-position sensors 300, each of which contact one of the three distinct encoder portions. The sensors 300 are formed from sprung connectors biased to contact the encoder pattern 310. A suitable material for the reasons is steel.

In the state shown in FIG. 4a, the sensors 300A and 300C are electrically connected via the conducting portions of the encoder 310. As the barrel rotates anti-clockwise, as viewed from the outer end of the cylinder 320, to the next stage, 300A will be connected to 300B, and so on. By monitoring the changes in which two of the three sensors are mutually connected at any given instant, the relative motion and direction of rotation of the roller barrel can be deduced.

The table below is derived from the schematic of the encoder portion shown at FIG. 4b and shows the connection states for the twelve steps corresponding to one rotation.

| Step | Connection Between |
| --- | --- |
| 1 | B and C |
| 2 | A and C |
| 3 | A and B |
| 4 | B and C |
| 5 | A and C |
| 6 | A and B |
| 7 | B and C |
| 8 | A and C |
| 9 | A and B |
| 10 | B and C |

-continued

| Step | Connection Between |
|---|---|
| 11 | A and C |
| 12 | A and B |

For instance, if the starting state of the barrel is at step 7, then sensors 300B and 300C are electrically connected. If the microprocessor monitoring the connections detects that 300A and 300C are now connected, then the roller barrel has been moved one step in a first direction that is to step 8 in this instance. If however, the microprocessor determines that 300A and 300B are now connected, then the roller barrel has moved one step in a second, opposite direction that is to step 6. The microprocessor is then able to adjust the display of the telephone in order to reflect this operation. For instance, the next or previous entry in the stored phone number directly can be displayed.

A detailed description of the ancillary apparatus related to the decoding process is not necessary to understand the operation of this invention, but if required, may be found in the previously referred to prior art document EP0901262A.

Figure 5A:
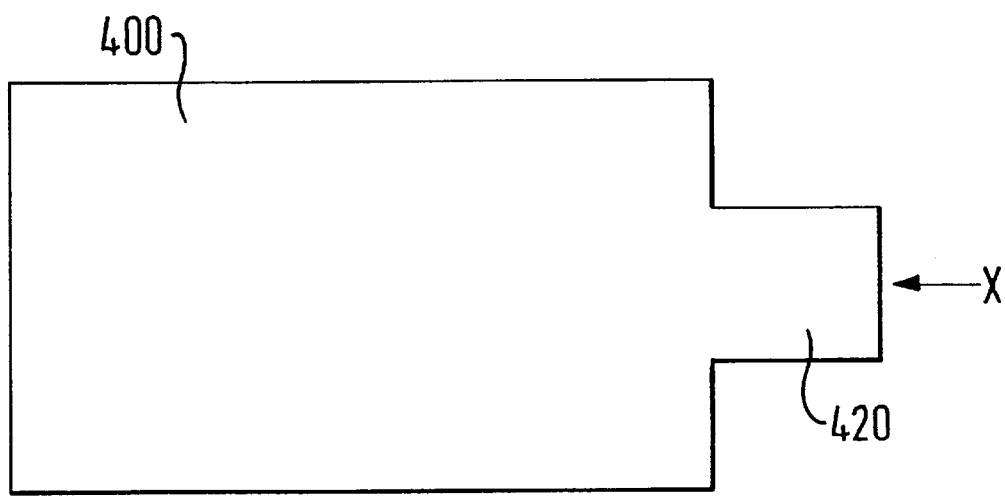
FIG. 5a shows a cross-sectional view of a roller switch barrel and encoder section.

A third embodiment of the roller switch is shown in cross-section in FIG. 5a. This shows a roller barrel 400 having a cylindrical projection 420 at one end.

The external appearance and properties of the roller barrel 400 are in all key respects identical to the previous embodiments. The mounting arrangement on a carriage, and its attachment to the telephone, is also identical in all key respects.

Figure 5B:
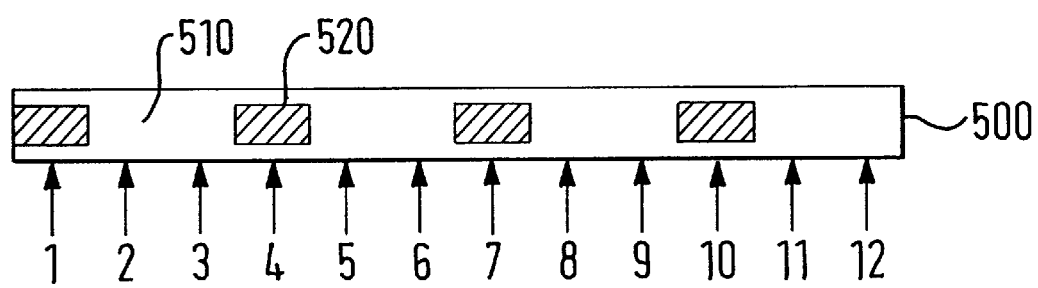

In this embodiment, the encoder pattern may be made simpler. The sensors can be arranged to contact the encoder pattern such that they run substantially parallel with the roller barrel axis of rotation, rather than contacting the encoder pattern tangentially as in the previous embodiments. As the sensors may be positioned so as to be spatially distant from each other, the encoder pattern 500 may consist of a single band of conducting 510 and non-conducting 520 portions, rather than the three bands discussed previously. This is shown schematically at FIG. 5b. Again, the non-conducting portions are shown as black areas 520, and the conducting portions are shown as white 510. It can be seen that the conducting portion is arranged so that it forms an electrically contiguous block. The numbered arrows in FIG. 5b show the 12 possible equilibrium positions of the three sensors.

Figure 5C:
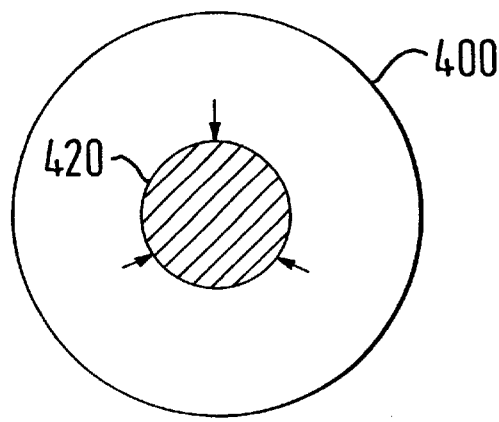

The encoder pattern is disposed on the outer surface of a protruding cylinder 420. This is positioned at a given end of the roller barrel 400. With this arrangement, the three sensors are arranged as shown by the arrows in FIG. 5c, which is an end view of the roller barrel 400 in the direction of Arrow X. They take the form of sprung steel elements which contact the cylinder 420 in the positions shown by the arrows. The sensors are configured to exert an inward pressure on the cylinder 420. Each of the three sensors is situated 120° from its neighbor. Other configurations comprising a greater or lesser number of sensors are envisaged, the use of three being exemplary only.

In the case where three sensors are used, the principle of operation is as follows. Consider starting position of the roller barrel 400 where the three 120° separated sensors are positioned at steps 3, 7 and 11 (Sensor A at position 3; sensor B at position 7; sensor C at position 11). In this roller position, sensors A and C are contacting the conducting portion 510 of the encoder, and so are electrically connected together. Sensor B is contacting a non-conducting portion 520, and so is insulated from the other two sensors.

Movement of the roller is possible in two directions. In the first direction, the sensors will be positioned at steps 2, 6, 10, and sensors A and B will be electrically connected. In the second direction, the sensors will be positioned at steps 4, 8, 12, and sensors B and C will be electrically connected. It can be seen that movement in the first direction produces a different set of connections to movement in the second direction, which is similar to the operation of the previously described movement.

In view of the foregoing description it will be evident to a person skilled in the art that various modifications may be made within the scope of the invention. In particular, the encoding technique disclosed above relies on an electrical contact between sensors and respective conducting and non-conducting portions of the encoder pattern. Other techniques could equally be used to the same effect. For instance, optical encoding relying on detection of respective light and dark areas could be used. Also, magnetic encoding, relying on respective magnetic and non-magnetic areas of the encoder pattern could be used. These techniques are, in themselves, well known in the art, and the skilled man could easily determine appropriate modifications to the apparatus disclosed herein to achieve the desired result.

The particular configuration of the encoder portion has been described in connection with three discrete bands in relation to the embodiment of FIG. 4a, and a single band in relation to the embodiment of FIG. 5a. The person skilled in the art will immediately realize that these schemes may be interchanged, and indeed other schemes, requiring greater or fewer discrete bands may be implemented without departing from the scope of the invention.

The present invention includes any novel feature or combination of features disclosed herein either explicitly or any generalisation thereof irrespective of whether or not it relates to the claimed invention or mitigates any or all of the problems addressed.

What is claimed is:

1. A rotary switch comprising:
    sensors;
    a rotatable barrel, having an axis of rotation; and
    an encoder pattern for sensing rotation of the barrel
        wherein the encoder pattern extends in a longitudinal direction with respect to the axis of rotation of the barrel; and wherein
    the encoder pattern comprises dark and light portions and the sensors are arranged to be sensitive to relative darkness of the encoder pattern.

2. A rotary switch as claimed in claim 1 wherein the encoder pattern is arranged to be coaxial with the axis of rotation of the roller barrel.

3. A rotary switch as claimed in claim 1 wherein the encoder pattern is disposed on an external surface of a projection extending from one end of the roller barrel.

4. A rotary switch as claimed in claim 3 wherein the projection is cylindrical in shape.

5. A rotary switch as claimed in claim 1 wherein the switch further comprises a plurality of sensors arranged to co-operate with the encoder pattern to produce signals indicative of rotation of the barrel.

6. A rotary switch as claimed in claim 5 wherein three sensors are provided.

7. A rotary switch as claimed in claim 1 wherein the roller barrel is arranged to have a plurality of distinct equilibrium positions.

8. A rotary switch as claimed in claim 1 wherein the rotary switch is adapted to pivot about a fixed point so as to allow actuation of a further switch disposed beneath the rotary switch.

9. A portable electronic apparatus comprising a rotary switch according to claim 1.

10. A portable electronic apparatus according to claim 9 wherein the apparatus is a telephone.

11. A rotary switch comprising:

a rotatable barrel, having an axis of rotation;

an encoder pattern for sensing rotation of the barrel wherein the encoder pattern comprises conducting and non-conducting portions and extends in a longitudinal direction with respect to the axis of rotation of the barrel; and at least three fixed-position sensors arranged to contact the encoder pattern as the barrel rotates, such that a first sub-set of the sensors contact the conducting portions of the encoder pattern and a second subset of the sensors contact the non-conducting portions of the encoder pattern, wherein rotation of the barrel varies, in a predetermined manner, which sensors are in the first sub-set and which sensors are in the second sub-set.

12. A rotary switch as claimed in claim 11, wherein there are three fixed position sensors, and the first subset consists of two sensors and the second sub-set consists of one sensor.

13. A rotary switch as claimed in claim 11, further comprising means for detecting a change in the identity of the sensors in at least one of the first subset and second sub-set to thereby detect movement of the barrel.

14. A rotary switch as claimed in claim 11, wherein the encoder pattern is arranged as three circumferential bands disposed adjacent each other and each band comprises alternatively conducting and non conducting portions.

15. A rotary switch as claimed in claim 11, wherein the encoder pattern comprises a single circumferential band of conducting and non-conducting portions.

* * * * *

UNITED STATES PATENT AND TRADEMARK OFFICE
CERTIFICATE OF CORRECTION

PATENT NO. : 6,813,509 B2
DATED : November 2, 2004
INVENTOR(S) : P. Barrowclough et al.

It is certified that error appears in the above-identified patent and that said Letters Patent is hereby corrected as shown below:

<u>Title page,</u>
Item [75], Inventors, should read:
-- Andrew Aguilar, Hemel Hempstead (GB);
  Phil Barrowclough, Basingstoke (GB) --.

Signed and Sealed this

Seventeenth Day of January, 2006

JON W. DUDAS
*Director of the United States Patent and Trademark Office*